United States Patent [19]
Sugiyama et al.

[11] Patent Number: 5,180,893
[45] Date of Patent: * Jan. 19, 1993

[54] METHOD OF HEATING THERMOPLASTIC BOTTLE OR PREFORM AND METHOD OF CONTROLLING TEMPERATURE OF HEATING MEMBER UTILIZED BY THE HEATING METHOD

[75] Inventors: Ikuo Sugiyama, Kanagawa; Kazuhisa Ishibashi, Tokyo; Nobuyuki Takakusaki, Kanagawa; Yoshitsugu Maruhashi, Kanagawa; Yasushi Nishimura, Kanagawa; Hiroshi Koyama, Tokyo; Setsuko Iida; Koji Sato, both of Kanagawa, all of Japan

[73] Assignee: Toyo Seikan Kaisha Ltd., Tokyo, Japan

[ * ] Notice: The portion of the term of this patent subsequent to Jul. 16, 2008 has been disclaimed.

[21] Appl. No.: 608,420

[22] Filed: Nov. 2, 1990

Related U.S. Application Data

[63] Continuation of Ser. No. 339,790, Feb. 7, 1990, Pat. No. 5,032,700.

[30] Foreign Application Priority Data

Jun. 9, 1987 [JP] Japan .................................. 62-142299
Nov. 5, 1987 [JP] Japan .................................. 62-278239
Jan. 19, 1988 [JP] Japan ........................................ 63-7416
Jun. 8, 1988 [JP] Japan .......................PCT/JP88/00553

[51] Int. Cl.[5] .............................................. H05B 6/10
[52] U.S. Cl. .............................. 219/10.43; 219/10.53; 219/10.77; 264/25
[58] Field of Search ............... 219/10.41, 10.43, 10.53, 219/10.491, 10.79.10.69, 10.67, 10.71, 10.75, 10.77, 388; 373/148, 149, 150; 264/25, 26, 27; 425/174.4, 174.8 R, 174.8 E

[56] References Cited

U.S. PATENT DOCUMENTS

| | | | |
|---|---|---|---|
| 3,539,693 | 11/1970 | Elischer | 373/150 |
| 4,315,725 | 2/1982 | Yoshino | 425/174.4 |
| 4,377,347 | 3/1983 | Hanmyo et al. | 373/149 X |
| 4,407,651 | 10/1983 | Beck et al. | 219/10.71 |
| 4,481,639 | 11/1984 | Archenholtz et al. | 373/150 |
| 4,579,080 | 4/1986 | Martin et al. | 219/10.491 |
| 4,857,687 | 8/1989 | Andersson et al. | 219/10.71 X |
| 5,032,700 | 7/1991 | Sugiyama et al. | 219/10.43 |

FOREIGN PATENT DOCUMENTS 57-89929 6/1982 Japan .
60-125650 7/1985 Japan .
62-77919 4/1987 Japan .

Primary Examiner—Philip H. Leung
Attorney, Agent, or Firm—Schwartz & Weinrieb

[57] ABSTRACT

This invention relates to a heating method for forming a thermoplastic bottle in which a heating member is inserted into the interior from a preform made of a thermoplastic material or the bottle and the preform or plastic bottle is heated by the heating member and a heating device located externally so as to thereby heat the same simultaneously internally and externally thereof, the temperature of the respective heating member being controlled respectively. Radiant heat energy distribution is variable along the longitudinal direction of the heating member so as to carry out the heating process in conformity with the bottle to be formed so as to manufacture the plastic bottle with high quality. A metal to be melted within a predetermined temperature range is enclosed in the heating member and the predetermined temperature of the heating member is maintained for a long period of time by the utilization of the latent heat of the metal so as to manufacture the plastic bottle with high quality under precise temperature setting conditions. The heating means is also utilized for the heating of a mouth portion of the plastic bottle so as to obtain a suitable crystallization of the mouth portion.

26 Claims, 10 Drawing Sheets

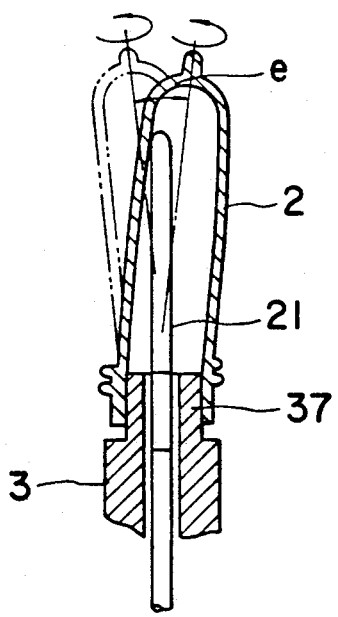 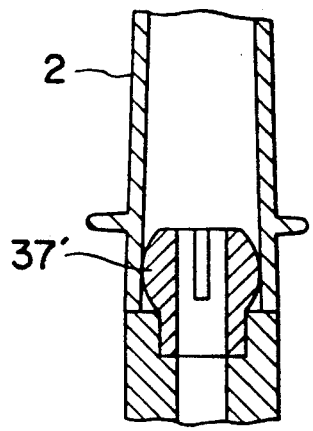
FIG. 16  FIG. 17
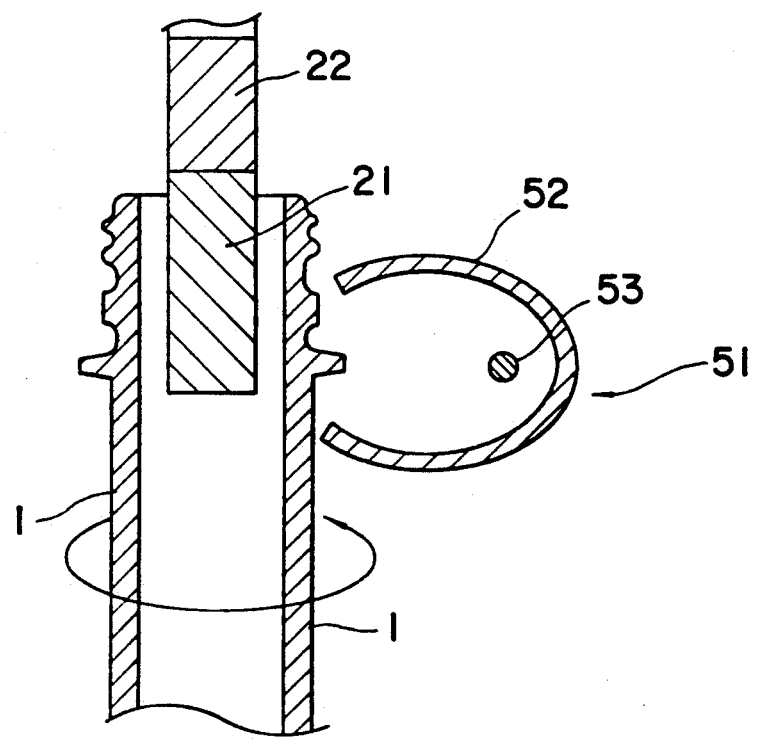
FIG. 18

METHOD OF HEATING THERMOPLASTIC BOTTLE OR PREFORM AND METHOD OF CONTROLLING TEMPERATURE OF HEATING MEMBER UTILIZED BY THE HEATING METHOD

This application is a continuation, of application Ser. No. 339,790, filed Feb. 7, 1989 U.S. Pat. No. 5,032,700.

TECHNICAL FIELD

This invention relates to a method for heating formed products of thermoplastic material for manufacturing bottles made of thermoplastic material and more particularly, to a heating method capable of effectively manufacturing bottles of this character within a short period of time.

BACKGROUND ART

Bottles made of thermoplastic material such as, for example, polyester have been widely employed as containers or bottles into which drinks or water such as, for example, fruit juice, coffee, mineral water, carbonated drinks such as, for example, cola or cider, or other similar drinks is to be contained. The formation of these plastic bottles has been performed by means of a method, that is, the so called biaxial stretching blow formation method, in which a preform made by means of an injection molding process is heated to a predetermined temperature, and the thus heated preform is extended axially within a mold by means of suitable extending rod member and simultaneously blown so as to be expand circumferentially.

In order to heat the preform, a non-contact heating method by means of an externally disposed infrared ray heater has been generally adapted, but recently in accordance with the requirement for large-sized containers or bottles, the thickness of the preform has become large. Accordingly, in view of the increased time required for the uniform heating of the preform in the direction of the thickness of the preform, a shortening of the remaining steps of the manufacturing process thereof has been required, and thus the conventional forming method referred to above cannot satisfy these requirements. In order to obviate these defects, there is provided a method, for example disclosed in the Japanese Patent Laid-open Publication No. 261024/1986, in which an internal heater is arranged inside the preform in addition to the conventional external heater, or a method which employs a jig, for example disclosed in the Japanese Patent Publication No. 43852/1987, in which a rod is heated by means of high frequency induction heating so as to thereby heat the preform internally and externally. There is also provided a method, for example disclosed in the Japanese Patent Laid-open Publication No. 163828/1986, in which a heating pipe is inserted into the preform so as to internally heat the same.

It is required, however, with respect to bottles made of plastic materials to control the heating level during the formation process so as to achieve the most suitable thickness distribution in the axial direction thereof in order to properly maintain the strength and the shape of the bottle. For this purpose, it is required to adjust the preform heating temperature along the axial direction of the preform, but with the methods disclosed in the Japanese Patent Laid-open Publication Nos. 261024/1986 and 163828/1986 referred to above, the preform is quickly heated by means of the internal and external heating thereof, whereby it is difficult to heat the preform in accordance with the desired predetermined temperature distribution in the axial direction. Moreover, in accordance with the heating method by means of the infrared ray heater, since a plurality of heaters are arranged in the axial direction of the preform and electric power to the individual heaters is respectively regulated as occasion demands, it is difficult to perform the rapid heating of the preform and sometimes an optional portion of the preform is unintentionally heated; to the predetermined temperature due to the thermal interference with the respective heaters.

In addition, with the method disclosed within the Japanese Patent Publication No. 43852/1987, a metallic rod disposed in the preform is heated by means of the induction heating, so that it is considerably difficult to measure the temperature of the metallic rod during or just before the induction heating process, whereby the heating of the metallic rod is not properly controlled. In addition, it is also sometimes difficult to suitably supply the preforms, and consequently, the temperature control of an individual metallic rod cannot be properly performed in the case where the preform is not supplied.

In order to precisely control the temperature of the preforms, it is necessary to maintain the temperature of a heating member at to precisely the predetermined temperature, but it is impossible by means of the conventional methods to strictly maintain the temperature so as to remain constant because the temperature of the heating member increases as a result of the absorption of the heat energy and decreases as a result of heat radiation, or because of various factors tending to vary the heating conditions.

DISCLOSURE OF THE INVENTION

In order to solve the problems described above, according to this invention there is provided a method of heating a preform by internally and externally supplying heat and heating the same, and wherein a heating zone for heating a member to be heated in a state mounted upon a heating member and another heating zone for heating the heating member with the member to be heated removed therefrom are disposed along a circular path comprising a plurality of substantially equally spaced heating members in such a manner that within the heating member heating zone the temperatures of the heating members are measured respectively and the heating members are subsequently heated in accordance with the measured temperatures by means of induction heating, and within the member to be heated heating zone the self-rotating members to be heated are mounted respectively upon the heated members heated.

Each heating member may be heated in two heating stages, one being with a predetermined amount of heat and the other being with an amount of heat for compensating for any temperature difference between the respective heating members.

Moreover, the member to be heated may be heated in accordance with a suitable axially varied radiant heat energy distribution in accordance with different modes such that the heating member may be provided with respective portions having outer diameters different from each other in the lengthwise direction thereof, the winding pitches of the heating coil serving as the high frequency induction heating member may be varied in the lengthwise direction of the heating member, and the induction heating coil is divided into several portions in the axial direction of the heating member and the electric power is applied to the respective coil portions in a controlled manner.

In addition, the heating member may be provided with an inner cavity within which there is disposed a substance having a melting point within the target control temperature range of the heating member, the temperature of the heating member is measured and the heating member is controlled in accordance with the measured temperature so as to thereby maintain the temperature of the heating member. Substantially constant with the embodiment described above, the temperature of the heating member may be controlled by providing at least two inner cavities within the heating member within which are disposed substances having melting points different from each other and applying to the heating member an amount of heat which is in proportion to the temperature difference between the temperature of the heating member and the melting points of the enclosed substances.

The heating members are heated in accordance with the individual temperatures measured by means of a thermometer, so that the temperatures of the heating members are established at predetermined values when inserted into the preforms, whereby the preforms at heated to the desired condition. The axially varied radiant heat energy distribution is applied to the heating member, so that the preform can be heated to a temperature for manufacturing a thermoplastic bottle, thus improving the quality of the formed products. In addition, a substance having a melting point within the target control temperature range is enclosed within the inner cavity of the heating member, so that the temperature of the heating member can be controlled by means of the latent heat of the enclosed substance so as to maintain the temperature constant for a long period of time, thus reducing the heating temperature differences between the respective heating members and, accordingly, enabling the manufacture of formed products with high quality.

BRIEF DESCRIPTION OF THE DRAWINGS

Various other objects, features, and attendant advantages of the present invention will become more fully apparent from the following detailed description, when considered in connection with the accompanying drawings, in which like reference characters designate like or corresponding parts throughout the several views, and wherein;

FIG. 16 is a view of the preform in a rotating condition;

FIG. 17 is a vertical sectional view of an improved mandrel core;

FIG. 18 is a partial sectional view of another embodiment of a preform utilized in connection with the process of the present invention;

BEST MODES FOR CARRYING-OUT THE INVENTION

Figure 1:
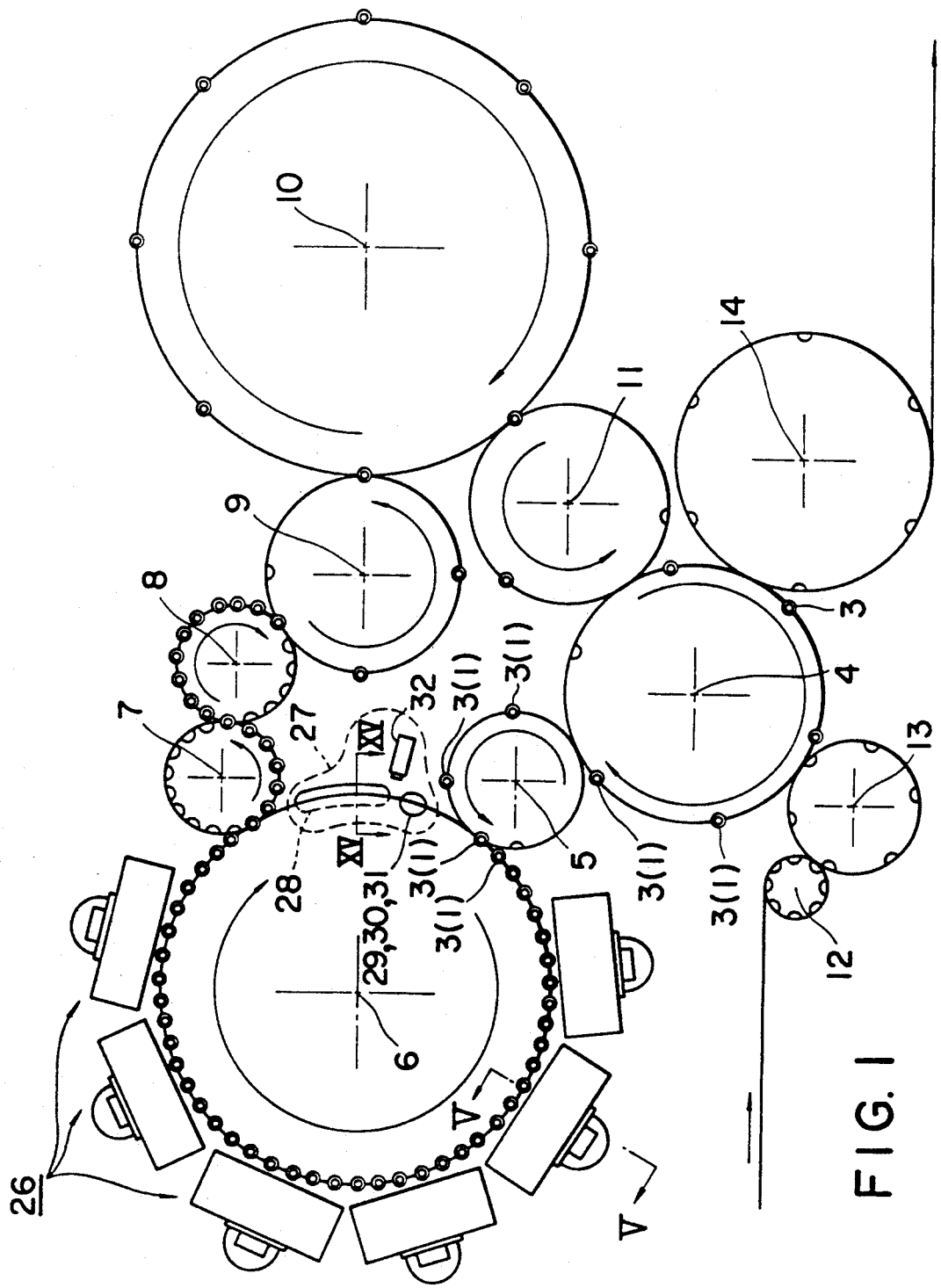
FIG. 1 is a plan view showing a first embodiment of a system developed in order to practice the method; according to this invention.
Figures 2, 3:
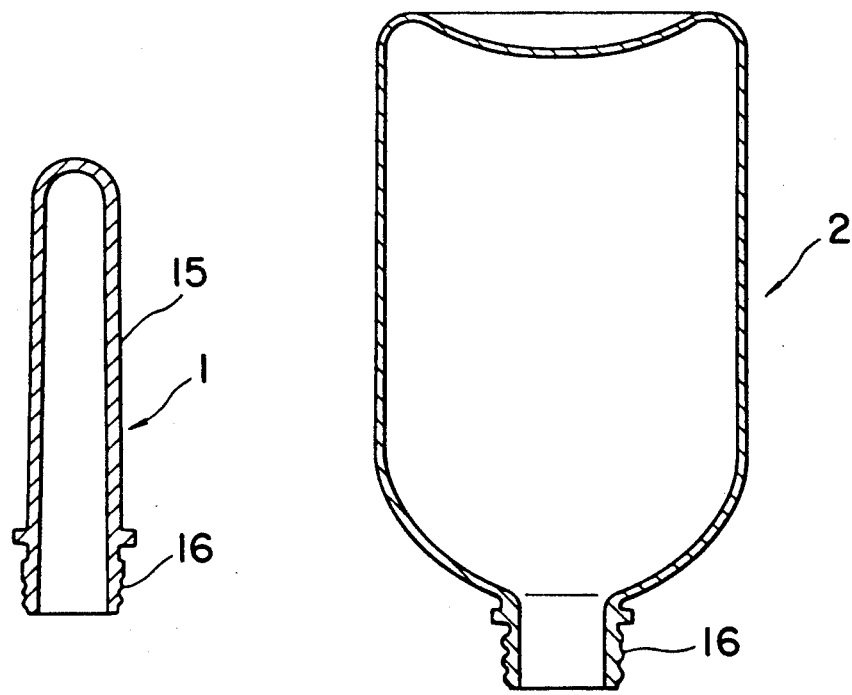
FIG. 2 is a vertical sectional view of a preform to be heated and utilized in accordance with the present invention.
FIG. 3 is a vertical sectional view of a thermoplastic bottle manufactured from the preform shown in FIG. 2.

Preferred embodiments of the present invention will be described hereunder with reference to the accompanying drawings, and FIG. 1 illustrates an entire heating system for practicing the method of this invention. The system shown comprises a preform circulation arrangement including a preform conveyor table 4 centrally located in FIG. 1, a transfer table 5, a heating station table 6, a set of station tables 7 and 8, a second transfer table 9, a blow-formation station table 10, and a third transfer table 11, the preform being circulated in this order and finally returning to the conveyor table 4. A plastic-made perform 1 of the shape shown in FIG. 2 and supported by means of a mandrel 3 (shown in FIG. 4) is heated upon the heating station table 6 and blow-formed upon the blow-formation station table 10 during its circulation along the respective station tables in the arranged and described order so as to be finally manufactured into a plastic bottle 2 as shown in FIG. 3. More in detail, each of the preforms 1 has an elevational section as shown in FIG. 2 and comprises a bottomed cylindrical barrel portion 15 and a mouth or opening portion 16 provided with threads or annular protrusions.

Figure 4:
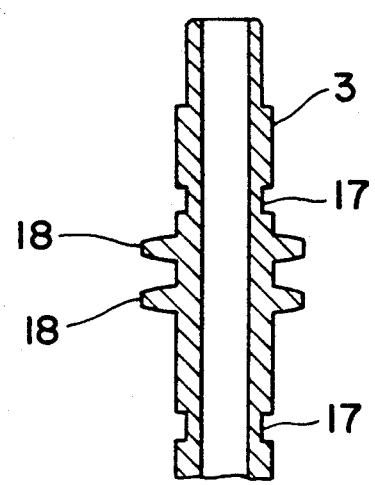
FIG. 4 is a vertical sectional view of a mandrel for supporting the preform shown in FIG. 2.

Each of the mandrels 3 has a cylindrical configuration as shown in FIG. 4 and is integrally provided with circumferential grooves 17, 17, so as to be firmly supported at the respective station tables, and sprockets 18, 18 for rotation of each mandrel 3. Chains, not shown, are disposed in a stepped manner over portions of the heating station table 6 and the annealing station tables 7 and 8 through which the mandrels 3 pass so as to be engaged with the upper and lower sprockets 18 of each mandrel 3 and are driven so as to impart a rotating motion to each mandrel 3 during the circulation there of among the respective station tables. During the circulation, process the preforms 1,1—are mounted upon the mandrels 3 by means of a supplying device, not shown, having a construction which is known per se and the barrel portion 15 of each preform 1 is heated upon the heating station table 6 and blow-formed by a known method at the blow-formation station table 10, thus forming a thermoplastic bottle 2 as shown in FIG. 3. The thus formed bottle 2 is removed from the mandrel 3 upon the conveyor table 4 by means of known device and then transferred to the next station through means of a feed transfer table 14.

Figure 5:
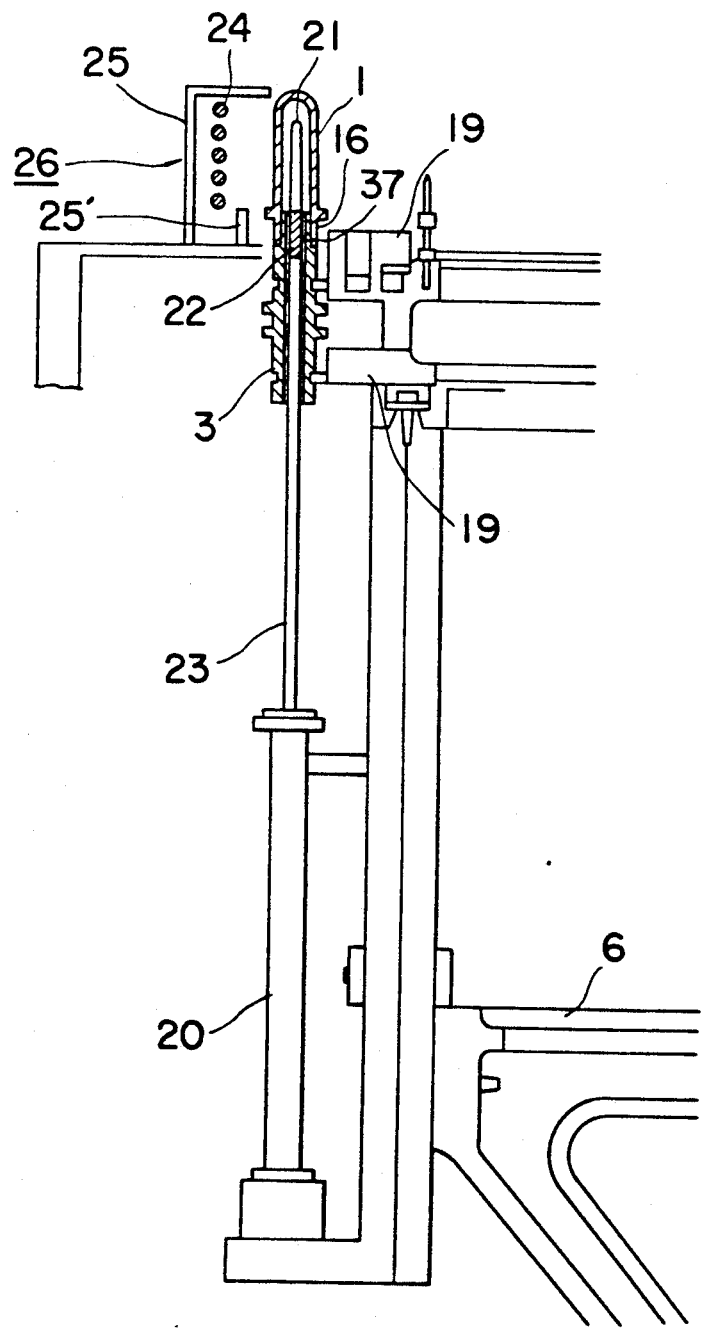
FIG. 5 is a sectional view taken along the line 5—5 as viewed in FIG. 1.
Figure 6:
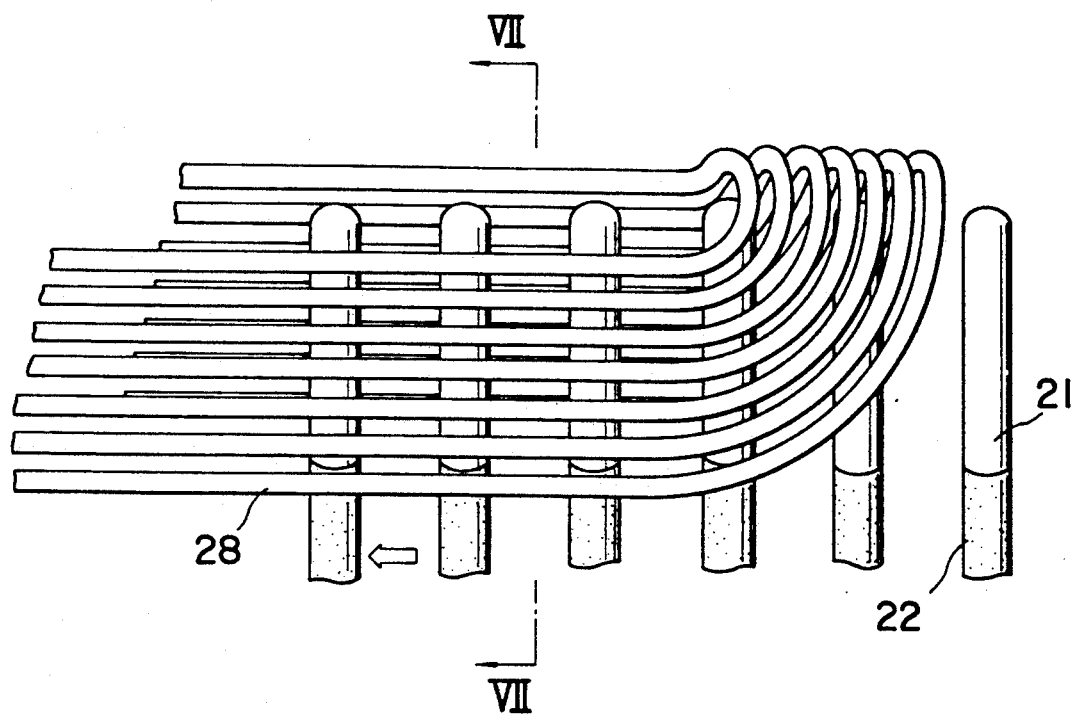
FIG. 6 is a perspective view of a first induction heating coil.
Figure 7:
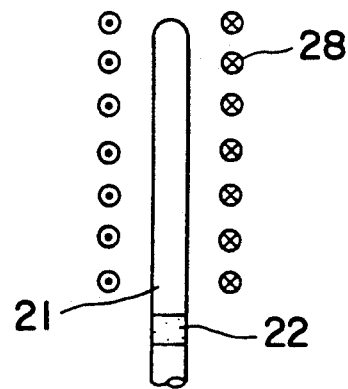
FIG. 7 is a sectional view taken along the line 7—7 as viewed in FIG. 6.
Figure 15:
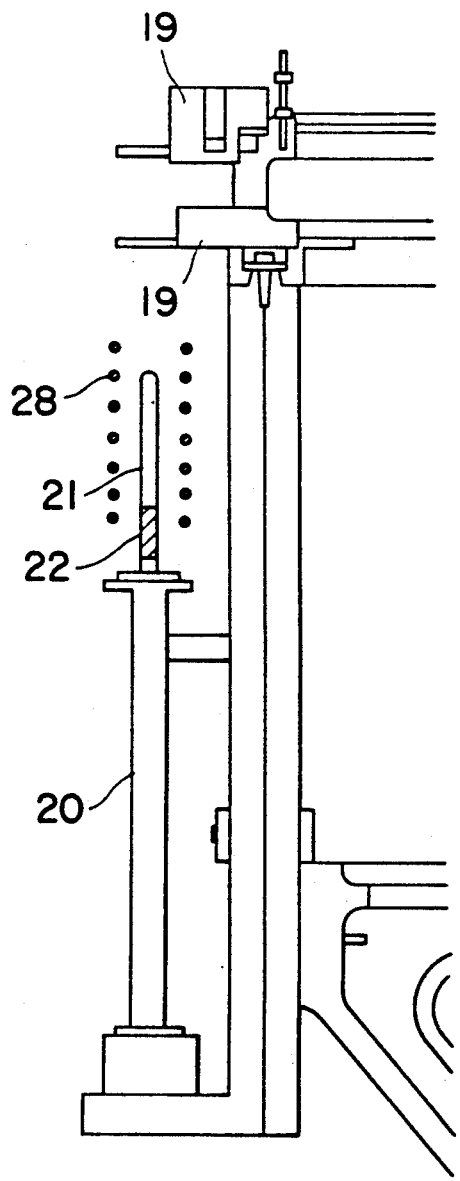
FIG. 15 is a sectional view taken along the line 15—15 as viewed in FIG. 1.

The heating station table 6 will be described hereunder with reference to FIGS. 5 to 15. The heating station table 6 has an entirely circular configuration and is equipped with a holding mechanism 19 for supporting the mandrel 3 as shown in FIG. 5, a heating member 21, and an air cylinder assembly 20, all of which are located at peripheral portions of table 6 with equal spaces defined there between. The holding mechanism 19 has a construction which is adapted to engage the circumferential grooves 17 of the mandrel 3, and it serves to hold the mandrel 3 at a predetermined position and release the same at a predetermined position. The heating member 21 is constructed as a rod-shaped metallic member which is able to be subjected to the induction heating and is operatively connected to a piston rod 23 of the air cylinder assembly 20 through means of a heat insulating member 22 in such a manner that when the heating member 21 is displayed upwardly by means of the actuation of the air cylinder assembly 20, the heating member 21 is inserted into the interior of the mandrel 3 supported by means of the holding mechanism 19. As shown in FIG. 5, the heat insulating member 22 is interposed between the heating member 21 and the piston rod 23 so as to be disposed within the vicinity of to the mouth portion 16 of the preform 1 and the mandrel core 37, and accordingly, the heat insulating member 22 serves to prevent the transfer of heat from the heating member 21 to the piston rod 23 as well as to suppress the heating of the mandrel core 37. A plurality of heating units constituting a heating zone for heating a member to be heated and a heating member heating zone 27 are arranged outside of the heating station table 6 along the circumferential direction thereof, and the heating units 26 comprise infrared ray heaters 24, reflecting mirrors 25, and reflecting mirrors 25' for reflecting the infrared rays so as not to heat the mouth portions 16 of the preforms 1, the heating units 26 being arranged so as to be disposed toward portions of the assembly through which the mandrels 3 pass and being adapted to externally heat the preforms 1 rotated together by means of the mandrels 3 with the radiant heat of the infrared rays. The heating member heating zone 27 comprises an infrared ray radiant heat thermometer 32 for measuring the temperture of the heating members 21 and a first induction heating coil 28 for heating each heating member 21 by means of induction heating in response to the measured temperature, the first induction heating coil 28 being arranged at a location at which the mandrels 3 do not pass and is disposed at a position within the vicinity of the heating members 21 when the members 21 are disposed at their lowered positions as shown in FIG. 15. FIGS. 6 and 7 illustrate one example of the first induction heating coil 28, which has a substantially circular shape and which is adapted to cover or overlie the movement path of the heating members 21 and is constructed, as shown, by laminating fine hair-pin shaped coils in multiple layers, both end portions thereof being upwardly biased so as to prevent any undesired movement of the movable members. In other words, at the heating station table 6, the mandrels 3 are received during the rotation of the table at predetermined locations by means of the mandrel holding mechanism 19, the heating members 21 heated within the heating zone 27 are inserted into the preforms 1 through means of the respective mandrels 3 so as to internally heat the preforms 1, and the preforms 1 are externally heated by means of the heating units 26 when the preforms 1 pass in front of the locations of the heating units 26.

In another example of the heating zone 27 in which a second heating coil 29 is disposed in addition to the provision of the first induction heating coil 28, the same is provided so as to constantly heat the heating zone 27, and to optionally terminate the heating of the heating members 21. According to the arrangement of the second heating coil 29, even in the case where the mandrel 3 is not provided with the preform 1 and the heating member 21 is directly exposed to the infrared ray heater 24 at the heating zone 27 and to a temperature greater than that to which the member is normally exposed, the second heating coil 29 serves to terminate the heating and to regulate the heating amount so as to prevent the over-heating of the system components and an excessive rise in the temperature.

Figure 8:
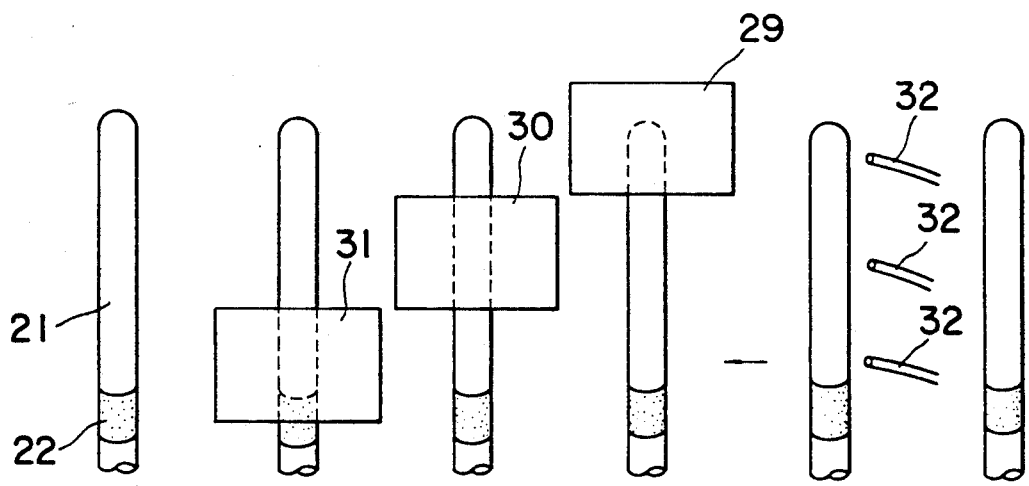
FIG. 8 is a view showing the arrangement of second induction heating coils.
Figure 9:
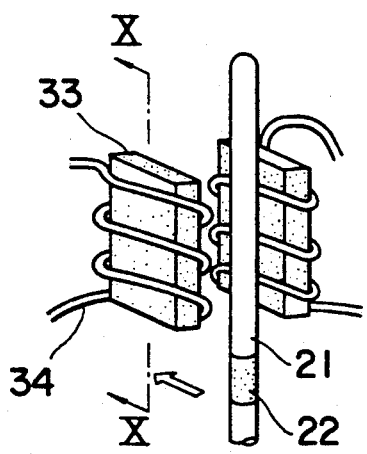
FIG. 9 is a perspective view showing one example of the use of the second induction heating coils.
Figure 10:
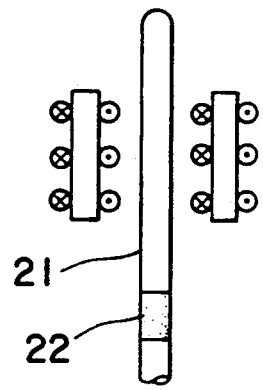
FIG. 10 is a sectional view taken along the line 10—10 as viewed in FIG. 9.

A preferred modification of the second induction heating coil 29 may comprise three components such as, for example, an induction heating coil 29 disposed within the vicinity of the upper portion of the heating member 21, an induction heating coil 30 disposed within the vicinity of the intermediate portion of the heating member 21 and an induction heating coil 31 disposed within the vicinity of the lower portion of the heating member 21, as shown, for example, in FIG. 8. FIGS. 9 and 10 show an arrangement of a coil utilized for these induction heating coils as coils 34 which are wound around two sheets of magnetic cores 33 and the respective heating coils 34 are arranged so as to have a space corresponding to the distance between the respective heating members 21 and so that the magnetic fluxes generated by means of the respective heating coils 34 do not mutually interfere with each other. The heating members 21 can pass through the space defined between the respective heating coils 34. The infrared ray radiant heat thermometers 32 are also arranged at three levels corresponding to the upper, intermediate and lower disposition levels of the heating member 21 at which the coils 29-31 are disposed so as to suitably measure the temperatures of these portions of the member 21. These thermometers 32, 32—are operatively connected to power control devices, not shown, so as to regulate the amount of electric power to be supplied to the heating coils 34 in accordance with the measured temperatures of the respective infrared ray radiant heat thermometers 32. Accordingly, the heating members 21 can be heated to predetermined temperatures by preliminarily establishing the relationship between the temperature difference between the detected temperatures of the infrared ray radiant heat thermometers 32 and the set temperatures of the heating members 21 and the electric power amount required to heat the heating members 21 to the set temperatures, and by supplying the electric power determined by the relationship to the second induction heating coils 29. The electric power may be set so as to be uniformly applied with respect to the upper, intermediate and lower portions of the heating member 21, so as to have a predetermined temperature distribution with respect to these portions. In an alternative case, an optional distribution of the radiant heat energy impinged upon the heating member 21 and the preform 1 can be derived such that the preform 1 can be heated in the most suitable manner in accordance with the thickness of the respective portions of the preform 1.

Figure 11:
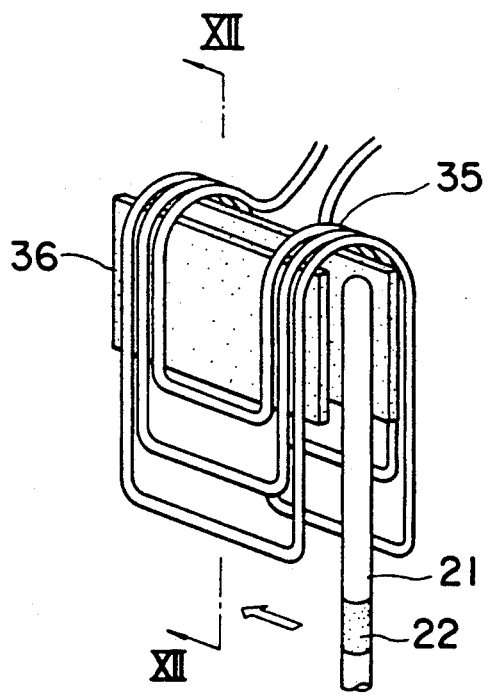
FIG. 11 is a perspective view showing another example of the use of the second induction heating coils.
Figure 12:
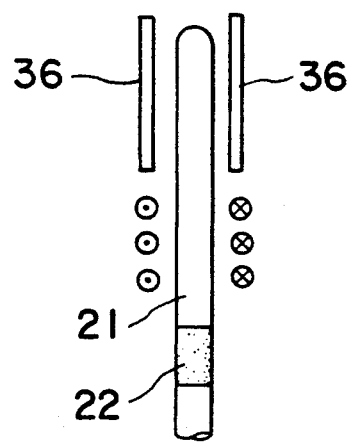
FIG. 12 is a sectional view taken along the line 12—12 as viewed in FIG. 11.

The arrangement of the second induction heating coil 29 may also be disposed as shown in FIGS. 11 and 12, by means of which the heating efficiency for the heating members 21 will be improved in comparison with that of the arrangement shown in FIG. 9. In FIG. 11, reference numeral 36 designates a copper plate and the copper plate 36 serves to block the heating effect of the heating coil with respect to the portion of the member 21 facing the copper plate 36 so as to perform partial heating of the heating member 21. The first induction heating coil 28 and the second induction heating coils 29, 30 and 31 disposed within the heating member heating zone 27 are designed, as shown respectively in FIGS. 7, 10, 12 and 14, so that reverse directional high frequency electric currents flow through the coils which face each other and with the heating member 21 interposed therebetween. Although in the illustrated and described embodiment, the heating coils are arranged in three separate stages, the present invention is not limited to this arrangement.

Figures 13, 14:
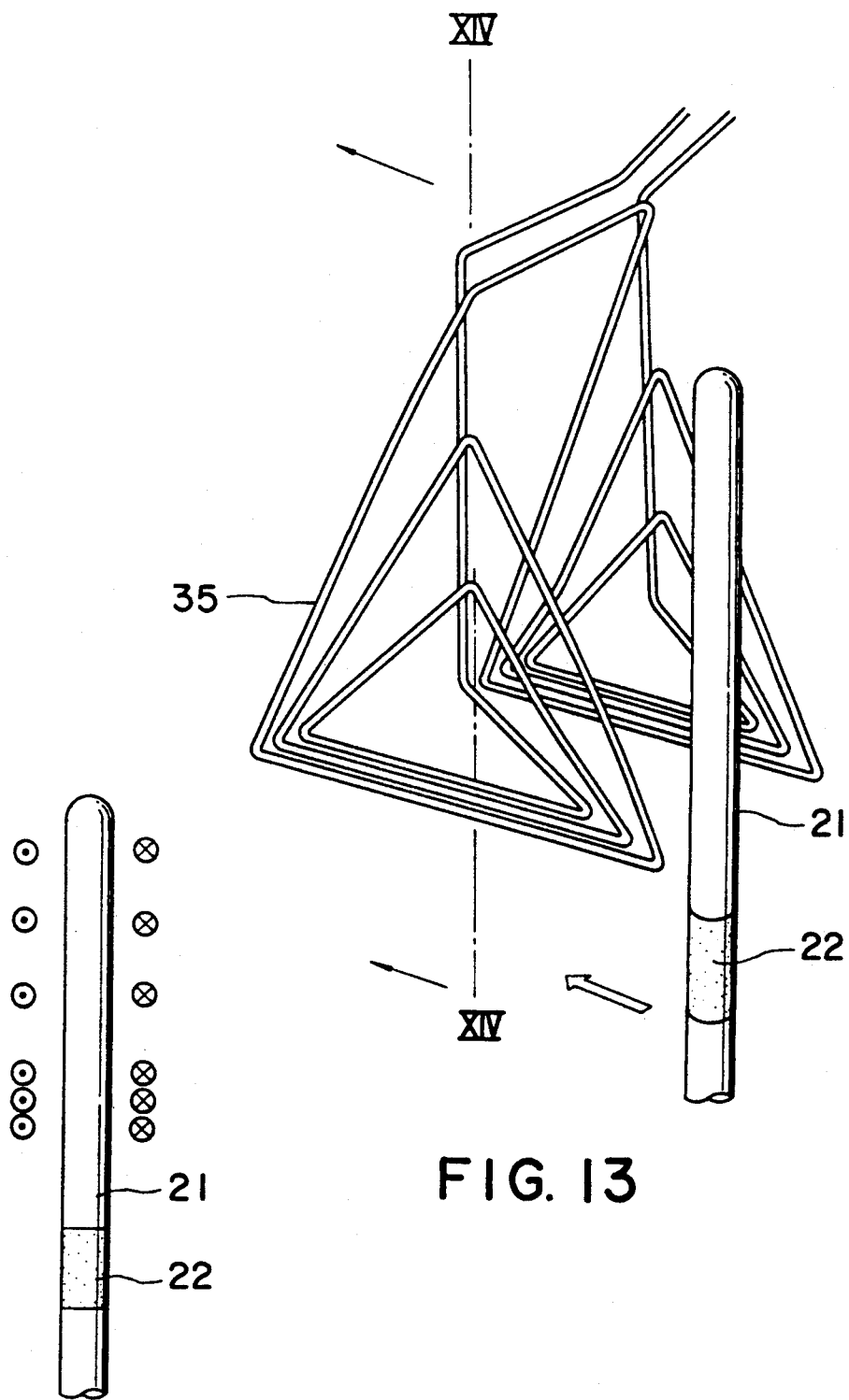
FIG. 13 is a perspective view showing an additional use of an induction heating coil according to a further embodiment of the present invention.
FIG. 14 is a sectional view taken along the line 14—14 as viewed in FIG. 13.

The radiant heat energy distribution along the longitudinal direction of the heating member 21 may be varied by varying the winding pitches of the heating coils, and referring to FIGS. 13 and 14, the coils 35 each have a triangular shape and are wound in such a manner that the bottom sides of the triangular coils 35 are mutually overlapped or disposed close to each other but the apexes of the respective triangles are positioned at different levels. According to this arrangement, the magnetic density is rendered large at the bottom side portions of the coils and renered small at the apexes thereof, and therefore, when the heating member 21 and the coils 35 are completely electromagnetically coupled, a temperature distribution is formed in accordance with the shapes of the coils 35. In addition, since a small amount of electric power is applied to those portions of the coil at which the distances defined between the coil sides is large, the heating efficiency is further improved. Moreover, since the distance defined between the two laterally spaced spiral coils is made narrow yet large enough that the heating member 21 is not contacted there by, the magnetic fluxes are disposed externally of the coils 35, so that even when the heating member 21 is disposed slightly away from the coil arrangement, the heating member 21 is hardly heated. Accordingly, the effective length of the coil for substantialy heating the heating member 21 is clearly defined. Although only one of the two spiral coils may be used as the heating coil, a good heating efficiency cannot be attained and the effective length of the coil may not be clearly defined.

In a modified method of applying radiant heat energy to the heating member 21 which is variable along the lengthwise direction thereof, it may be possible to vary the outer diameter of the heating member 21, and in this modified method, it is not always necessary to vary the temperature in and along the lengthwise direction thereof. For example, when a large amount of radiant heat energy is applied to a thickened portion of the preform, such as, for example, the bottom of the preform 1, the front portion of the heating member 21 is elongated so as to increase the accumulated heat amount. This operation may of course be utilized or applied in connection with any particular; portion in the longitudinal direction of the heating member 21 instead of only the front portion. Thereof in an alternative manner, a heat insulating member maybe located at a portion of the heating member 21 so as to block the radiant heat energy with respect to that portion of the member 21 and thereby suppress the temperature within that portion of the preform 1 corresponding to that portion of the member 21.

Accordingly, the heating member 21 can always be maintained at a predetermined temperature by means of the heating member heating zone 27 so as to thereby not only maintain the temperature entirely uniform but also to apply the temperature distribution to the desired portions of the heating member 21 by easily adjusting the winding pitches of the heating coils or the electric power to be applied to the coils. In addition, the variation of the outer diameter of the heating member 21 along the lengthwise direction thereof makes it possible to optionally distribute the radiant heat energy along that direction. Thus, the preform 1 can be set to have a predetermined temperature and a thermoplastic bottle 2 can be manufactured under the most suitable conditions. In the preferred embodiment described, above the heating units 26 for externally heating the preforms 1 are arranged along the outer circumferential portion of the mandrel passage, but the present invention is not limited to the previously described embodiment and the heating units 26 may be arranged along the inner circumferential portion as well as along the outer circumferential portion of the mandrel passage. An air blowing device may be further disposed for blowing air towards the heating member 21 so as to prevent the heating member 21 from overheating and for cooling the same.

At the time of starting the operation of the forming machine, it is necessary to heat the heating member 21 to a predetermined temperature above the room temperature within a short period of time, but the respective portions of the heating member 21 are different in the degrees of their radiant heat during the circulation of the same among the respective stations or tables, and particularly, the radiant heat of the lower portions of the heating members 21 is observed to be large while the temperature of those portions is largely lowered because those portions are connected to the heat insulating member 22 and the piston rod 23. Even in such a case where the temperature variation in elapsed time is different at the respective portions of the heating member 21, it can easily be heated to the predetermined temperature by means of the arrangement and method described above.

The first induction heating coil 28 for attaining the constant heating may be eliminated in accordance with one modification by increasing the heating capacity of the second induction heating coils 29, 30 and 31. It is desired to heat the heating member 21 to a temperature ranging between approximately 300° to 600° C. This is because, below 300° C., the radiant heat is too small to attain the desired heating efficiency from the inside of the preform 1 having a large thickness, whereas over 600° C., the inner surface of the preform is overheated in comparison with the outer surface or the central portion, of the preform whereby the uniform heating effect is not obtained. In fact, in accordance with a conducted experiment or test, when the heating member 21 was heated to a temperature level above 600° C., violent degradation due to oxidation was observed, such of course not being suitable for practical use.

As described above with reference to the preferred embodiment of the present invention, the method of the present invention is very effective in view of the high speed heating and the uniform heating, but in the case where the preform 1 mounted upon the mandrel core portion 37, as shown in FIG. 16, is rotated in a largely eccentric manner, the preform may be circumferentially non-uniformly heated because of the disposition of the heating member 21 close to inner surface positions of the preform 1. Such eccentric rotational movement of the preform 1 is caused by the relationship defined between the unevenness of the inner diameters of the mouth portions of the preforms 1 and the core diameter of the mandrel or by differences characteristic of the heat-mounting methods of the preforms 1, and the extent of the eccentricity is different with respect to each mandrel. In order to obviate this fault, the mandrel core 37', as shown in FIG. 17, is manufactured so as to include a quartered or slotted springy member endowed with resiliency so as to be slightly outwardly expanded before the mounting of the preform 1, and in addition, the preform is forcibly mounted against the resiliency force of the springy member while maintaining the direction of the preform 1 so as to be in accord with the axis of the mandrel 3. By virtue of this mounting or inserting method, the eccentricity of the preform 1 with respect to the mandrel is hardly observed, and the value e of the diameter eccentricity, as shown in FIG. 16, was regulated to a value within one fifth of the inner diameter of the preform 1 whereby the circumferentially uniform heating was attained. The value e of the diameter eccentricity is desired to be less than one tenth of the inner diameter of the preform 1, and in case the value e satisfies this condition, non-uniform heating based upon this eccentricity will be substantially eliminated. The rotational movement of the preform 1 may thus be reduced or substantially eliminated by suitably locating a guide member for restricting the movement of the front portion of the preform 1.

Next, there is disclosed another example of the heating member 21, in which a substance fusible at a temperature within the temperature range of the heating member 21 is enclosed within the interior thereof.

Figure 19:
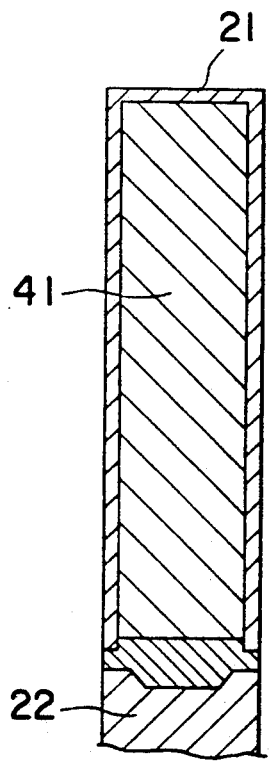
FIG. 19 is an enlarged vertical sectional view of a first example of the heating member utilized in conjunction with the process of the present invention.
Figure 22:
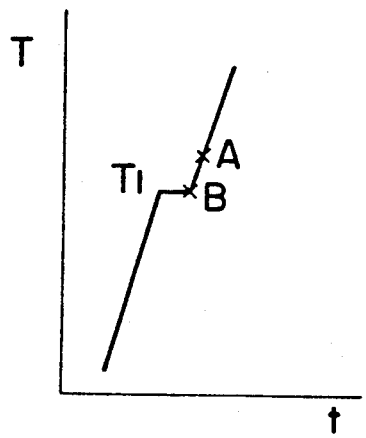
FIG. 22 is a graph representing a temperature elevation curve concerning the first example of the heating member shown in FIG. 19.
Figure 23:
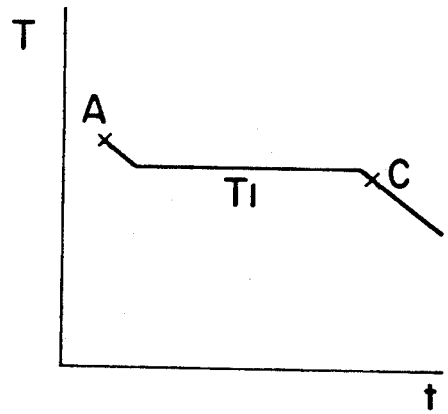
FIG. 23 is a graph representing a temperature cooling curve concerning the first example of the heating member.

FIG. 19 shows one example of the hollow heating member 21 provided with an inner cavity 41 into which zinc having a melting point of 420° C. is enclosed, but the outer configuration or the like of the heating member 21 shown in FIG. 19 is substantially the same as that of the former embodiments. When the heating member 21 of this hollow type configuration is heated within the heating zone 27 of the heating station table 6, the heating member 21 is heated in accordance with the temperature elevation curve shown in FIG. 22. When the heating member 21 is heated to the point A upon the curve of FIG. 22, the heating member 21 is cooled in accordance with the cooling curve shown in FIG. 23. Namely, the heating member 21 exhibits substantially no change in its temperature for a predetermined time interval at the temperature T1 even if the thermal energy is applied or released by means of the latent heat of the fused metal enclosed within the interior of the heating member 21. Accordingly, by heating the heating member 21 to the point B in FIG. 22, that is, until the enclosed zinc has been completely melted, and inserting the thus heated heating member 21 into the preform 1, the preform 1 can be heated by means of the heating member 21 which maintains this temperature for a long period of time, thus being capable of heating the preform at a precisely controlled temperature level. Referring to FIG. 22, the letter t denotes time, T denotes the temperature of the heating member 21 and T1 is the melting point of the enclosed zinc metal. In the case where it is detected by means of the infrared ray radiant heat thermometer 32 that the temperature of the heating member 21 does not reach the melting point T1 of the enclosed metal such as for example point C in FIG. 23, high frequency electric power programmed in accordance with the temperature difference of such temperature at point C from the melting point, as shown in FIG. 22, is applied to the second induction heating coil 29 for an extremely short time interval (0.5 sec.) so as to heat the high melting point metal enclosed within the heating member 21, and preferably in a state at which the enclosed metal has been entirely liquefied, that is, to the point B.

Figure 20:
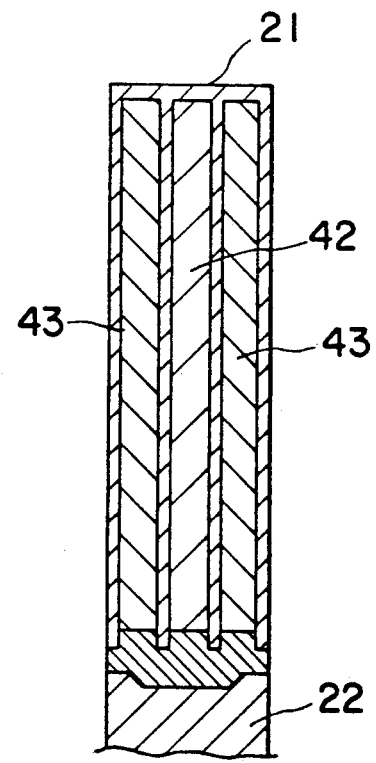
FIG. 20 is an enlarged vertical sectional view of a second example of the heating member utilized in connection with the process of the present invention.
Figure 21:
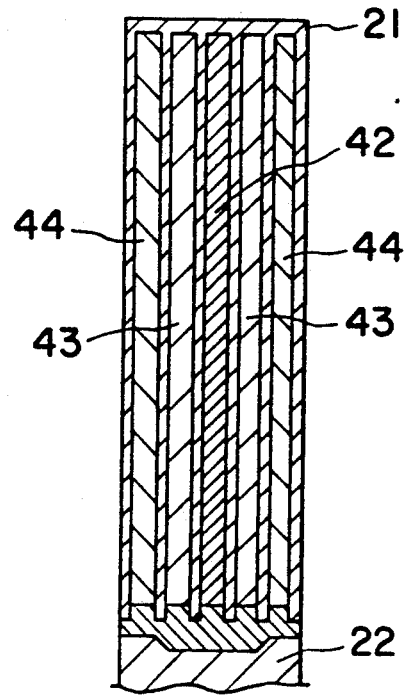
FIG. 21 is an enlarged vertical sectional view of a third example of the heating member utilized in connection with the process of the present invention.

FIG. 20 shows another example of a hollow heating member 21, which is provided with a first inner cavity 42 and a second inner cavity 43 into which high and low melting point metals are disposed, respectively. Zinc is utilized as the high melting point metal and a tin-tellurium alloy is utilized as the low melting point metal the latter having a composition essentially consisting of 15% of tin and 85% of tellurium, which will result in a eutectic structure wherein the an eutectic stagnation temperature corresponding to the melting point is approximately 410° C. FIG. 21 also shows a further example of the hollow heating member 21 provided with first, second and third inner cavities 42, 43 and 44 into which a tin-tellurium alloy, zinc and tellurium are disposed, respectively, and the composition of the tin-tellurium alloy of FIG. 21 is the same as that of FIG. 20, the melting point of tellurium being approximately 450° C.

Figure 24:
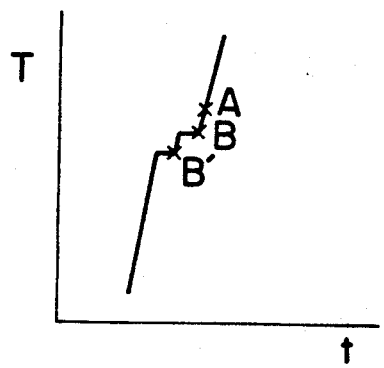
FIG. 24 is a graph representing a temperature elevation curve concerning the second example of the heating member of FIG. 20.
Figure 25:
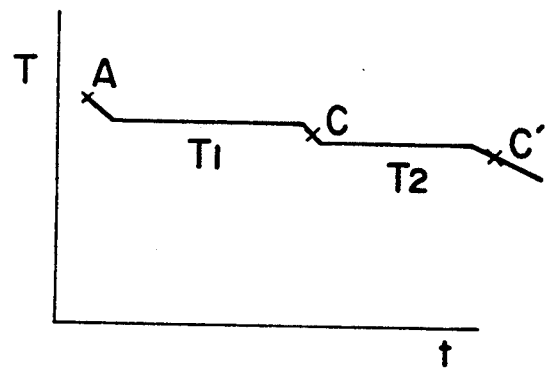
FIG. 25 is a graph representing a temperature cooling curve concerning the second example of the heating member.

Concerning the second example of the heating member 21 shown in FIG. 20, the temperature elevation curve of the heating member 21 is represented by means of FIG. 24 and the natural cooling curve thereof is represented by means of FIG. 25, and in the figures, the letter designation T2 denotes the melting point of the low melting point metal, that is, the tin-tellurium alloy. The temperature control of the heating member 21 of the second example is achieved in substantially the same manner as that of the first example, and for instance, in the case where the melting point is the temperature at point B in FIG. 25, and if the temperature of the heating member has not reached the melting point B and is only at a temperature level C as shown in FIG. 25, electric power is applied to the second induction heating coil 29 so as to increase the temperature to the point B in FIG. 24. In this case, even if it is erroneously detected that the heating member has a high temperature in spite of the detection fault of the radiant heat thermometer 32, the temperature of the heating member 21 is not substantially lowered by means of the heat of solidification of the tin-tellurium alloy. Moreover, when the target temperature to be controlled is selected to be at the point C', the temperature is controlled so as to raise the temperature to the point B'. However, even if the temperature difference is erroneously detected as a value larger than the actual value as a result of a fault of the thermometer and, as a result, electric power is excessively supplied to the second induction heating coil 29, the temperature of the heating member 21 is not substantially raised by as result of a the heat of fusion of the enclosed zinc, thus performing excellent temperature control.

Figure 26:
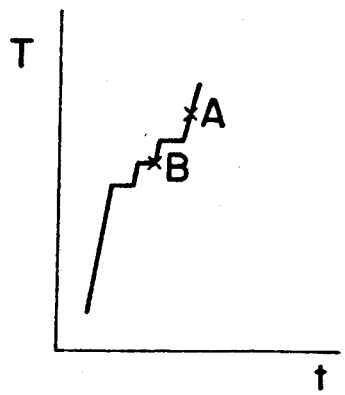
FIG. 26 is a temperature elevation curve of the third heating member of FIG. 21.
Figure 27:
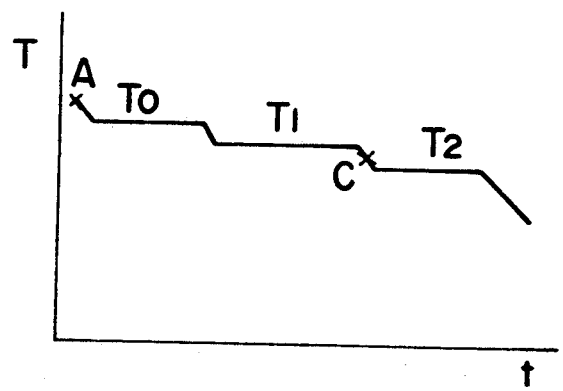
FIG. 27 is a temperature cooling curve of the third heating member of FIG. 21.

Concerning the third example of the hollow heating member 21 shown in FIG. 21, the temperature elevation curve of the heating member 21 is represented by means of FIG. 26 and the natural cooling curve thereof is represented by means of FIG. 27, in which letter designation T0 denotes the melting point of tellurium. When the temperature at the point C in FIG. 27 is detected, substantially the same control as that of the first and second example is made so as to raise the temperature to the point B in FIG. 26, but control with greater accuracy can be made by enclosing three kinds of metals having different melting points within the inner cavities of the hollow heating member 21. The heating capacity of the heating member heating zone 27 and the amount of metals enclosed are set so as not to render the enclosed metals solidified during the circulation of the heating member 21. Accordingly, in actuality, the enclosed metals are partially in liquid state and partially in the solid state during the circulation of the heating member around the heating station table 6, so that the temperature of the heating member 21 can be maintained substantially within the vicinity of the temperatures of the melting points of the enclosed metals or at a temperature characteristic of the metal during the circulation thereof. Namely, the temperature of the heating member 21 of the first example is maintained at approximately 420°. Regarding the heating member 21 of the second example, in the case where the controlling point is selected to be the point C in FIG. 25, the temperature of the heating member 21 is maintained at approximately 420° C. and in the case where the controlling point is selected to be the point C', the temperature is maintained at approximately 410° C. The temperature of the heating member 21 of the third example is stably maintained at approximately 420° C. Accordingly, since the preforms 1 can be heated by means of the heating members 21 having the precisely controlled temperatures, plastic bottles 2 with high quality can be manufactured.

With the preferred embodiments described above, although the heating member 21 is made of metal and heated by means of induction heating methods this invention is not limited to those embodiments and the heating members 21 may be made of ceramic materials and heated by means of infrared ray heaters.

A method of crystallizing the mouth portion 16 of the preform 1 by means of an application of the heating method described hereinbefore will be described hereunder with reference to FIG. 18. The crystallization of the mouth portion 16 is achieved for the purpose of improving the stiffness and the heat resistance of the mouth portion 16 of the preform 1. Concretely, the heating member 21 is inserted into the mouth portion 16 of the preform 1 or plastic bottle 2 attached to the heating means such as, for example, the heating station table 6 and the mouth portion 16 is heated by means of an infrared ray collecting device 51 of the type shown in FIG. 18. The infrared ray collecting device 51 comprises a reflecting mirror 52 having an elliptical section and disposed about a linear infrared ray heater 53, which is arranged upon one focus of the elliptical reflecting mirror 52, and the mouth portion 16 is arranged upon the other focus thereof. In this case, any structure described above with respect to the various embodiments of the heating member 21 may be selected and any heating means may also be selected. According to this method, the mouth portion 16 can be easily and precisely crystallized in the most suitable manner in conjunction with the above-described formation of the preform 1.

As described hereinbefore, according to this invention, since the temperature of the heating member for internally heating the preform is measured and the heating of the heating member is controlled in accordance with the measured temperature, the setting of the temperature can be accurately accomplished within a short period of time, thus improving the manufacturing capability. Radiant heat energy variable in the lengthwise direction of the heating member can be effectively distributed therealong, so that the respective portions of the preform can be heated to predetermined temperatures suitable for the blow-formation of the plastic bottle. Moreover, since substances having predetermined melting points can be enclosed within the hollow heating member, the temperature of the heating member can be controlled so as to stably maintain the temperature within a relatively narrow range, even if the absorbed heat amount or radiant heat amount varies significantly by setting the common temperature of the substances to target control temperature. Therefore, the preforms can always be constantly heated by utilizing such heating members a heating source for the preforms adapted to form plastic products such as, for example, plastic bottles, thus improving the quality of the formed products. In addition, in case the heating method described above is utilized for heating the mouth portion of the preform, the crystallization of that portion of the preform can also be speedily and precisely performed.

Obviously, many modifications and variations of the present invention are possible in light of the above teachings. It is therefore to be understood that within the scope of the appended claims, the present invention may be practiced otherwise than as specifically described herein.

What is claimed is:

1. A method of heating a mouth portion of a plastic preform, comprising the steps of:
   providing an internal heating member which is movable along a circulating path;
   providing external heating means at an external heating station fixed along said circulating path;
   measuring the temperature of said internal heating member prior to the insertion of said internal heating member into said preform to be heated;

adjusting the temperature of said internal heating member to a predetermined temperature by heating said internal heating member in accordance with any difference between said measured temperature and said predetermined temperature;

inserting said internal heating member, which has been heated to said predetermined temperature, into said preform to be heated;

circulating said internal heating member, having said preform disposed thereon, past said external heating means such that said preform is simultaneously heated both externally and internally by said external heating means and said internal heating member;

removing said heated preform from said internal heating member; and recirculating said internal heating member along said circulating path.

2. The method as set forth in claim 1, wherein:

a maximum eccentricity of said mouth portion of said plastic preform during rotation thereof is limited to less than one-fifth of the inner diameter of said mouth portion of said plastic preform.

3. The method as set forth in claim 1, wherein:

said heating member is heated in at least two stages, one being with a predetermined amount of heat, and the other being with an amount of heat for eliminating any temperature difference between the temperature of said heating member and a predetermined temperature.

4. The method as set forth in claim 1, wherein:

said heating member is heated so as to have a radiant heat energy distribution which varies along the axial length of said heating member so as to apply a heat distribution to said mouth portion of said plastic preform to be heated.

5. The method as set forth in claim 4, wherein:

said heating member is provided with respective portions having outer diameters which are different from each other so as to create an axially varied radiant heat energy distribution with respect to said mouth portion of said plastic preform to be heated.

6. The method as set forth in claim 1, wherein:

said adjustment of said temperature of said internal heating member to said predetermined temperature is achieved by inductively heating said internal heating member.

7. The method as set forth in claim 6, wherein:

said induction heating is effected by means of an induction heating coil having winding pitches which vary along the lengthwise direction of said heating member so as to create an axially varied radiant heat energy distribution with respect to said mouth portion of said plastic preform to be heated.

8. The method as set forth in claim 7, wherein:

said induction heating coil is divided into a plurality of portions in the axial direction of said heating member, and electric power to be applied to said plurality of portions of said divided induction heating coil is controlled so as to thereby create an axially varied radiant heat energy distribution with respect to said mouth portion of said plastic preform to be heated.

9. The method as set forth in claim 1, wherein:

said adjustment of said temperature of said internal heating member to said predetermined temperature is achieved by heating said internal heating member by infrared heating means.

10. The method as set forth in claim 1, wherein:

said heating member is heated to a temperature within the range of 300°-600° C.

11. A method of controlling the temperature of a heating member, to be used as an internal heating member for internally heating a mouth portion of a plastic preform, such that said temperature of said heating member remains substantially constant throughout a period of time within which said heating member is utilized to internally heat said mouth portion of said plastic preform at said substantially constant temperature of said heating member, comprising the steps of:

providing said heating member with an inner cavity;

depositing a substance, having a melting point which substantially corresponds to a predetermined temperature at which said mouth portion of said plastic preform is to be heated, into said inner cavity of said heating member;

measuring the temperature of said heating member;

heating said heating member to a temperature level which is at least equal to said melting point of said substance disposed within said inner cavity of said heating member if said measured temperature of said heating member is below said melting point of said substance disposed within said inner cavity of said heating member; and inserting said heating member, having a temperature at least equal to said melting point of said substance disposed within said inner cavity of said heating member, into said mouth portion of said plastic preform so as to heat said mouth portion of said plastic preform at said substantially constant temperature as controlled by means of said melted substance disposed within said inner cavity of said heating member.

12. The method as set forth in claim 11, wherein:

said heating member is provided with at least two inner cavities within which are disposed substances having melting points which are different from each other.

13. The method as set forth in claim 11, wherein:

said heating member is provided with at least three inner cavities within which are disposed substances having melting points which are different from each other.

14. A method of heating a mouth portion of a plastic bottle, comprising the steps of:

providing an internal heating member which is movable along a circulating path;

providing external heating means at an external heating station fixed along said circulating path;

measuring the temperature of said internal heating member prior to the insertion of said internal heating member into said mouth portion of said plastic bottle to be heated;

adjusting the temperature of said internal heating member to a predetermined temperature by heating said internal heating member in accordance with any difference between said measured temperature and said predetermined temperature;

inserting said internal heating member, which has been heated to said predetermined temperature, into said mouth portion of said plastic bottle to be heated;

circulating said internal heating member, having said mouth portion of said plastic bottle disposed thereon, past said external heating means such that said mouth portion of said plastic bottle to be heated is simultaneously heated both externally and internally by said external heating means and said internal heating member;

removing said heated plastic bottle from said internal heating member; and recirculating said internal heating member along said circulating path.

15. The method as set forth in claim 14, wherein:

a maximum eccentricity of said mouth portion of said plastic bottle during rotation thereof is limited to less than one-fifth of the inner diameter of said mouth portion of said plastic bottle.

16. The method as set forth in claim 14, wherein:

said heating member is heated in at least two stages, one being with a predetermined amount of heat, and the other being with an amount of heat for eliminating any temperature difference between the temperature of said heating member and a predetermined temperature.

17. The method as set forth in claim 14, wherein:

said heating member is heated so as to have a radiant heat energy distribution which varies along the axial length of said heating member so as to apply a heat distribution to said mouth portion of said plastic bottle to be heated.

18. The method as set forth in claim 17, wherein:

said heating member is provided with respective portions having outer diameters which are different from each other so as to create an axially varied radiant heat energy distribution with respect to said mouth portion of said plastic bottle to be heated.

19. The method as set forth in claim 14, wherein:

said adjustment of said temperature of said internal heating member to said predetermined temperature is achieved by inductively heating said internal heating member.

20. The method as set forth in claim 19, wherein:

said induction heating is effected by means of an induction heating coil having winding pitches which vary along the lengthwise direction of said heating member so as to create an axially varied radiant heat energy distribution with respect to said mouth portion of said plastic bottle to be heated.

21. The method as set forth in claim 20, wherein:

said induction heating coil is divided into a plurality of portions in the axial direction of said heating member, and electric power to be applied to said plurality of portions of said divided induction heating coil is controlled so as to thereby create an axially varied radiant heat energy distribution with respect to said mouth portion of said plastic bottle to be heated.

22. The method as set forth in claim 14, wherein:

said adjustment of said temperature of said internal heating member to said predetermined temperature is achieved by heating said internal heating member by infrared heating means.

23. The method as set forth in claim 14, wherein:

said internal heating member is heated to a temperature within the range of 300°-600° C.

24. A method of controlling the temperature of a heating member, to be used as an internal heating member for internally heating a mouth portion of a plastic bottle, such that said temperature of said heating member remains substantially constant throughout a period of time within which said heating member is utilized to internally heat said mouth portion of said plastic bottle at said substantially constant temperature of said heating member, comprising the steps of:

providing said internal heating member with an inner cavity;

depositing a substance, having a melting point which substantially corresponds to a predetermined temperature at which said mouth portion of said plastic bottle is to be heated, into said inner cavity of said internal heating member;

measuring the temperature of said internal heating member;

heating said internal heating member to a temperature level which is at least equal to said melting point of said substance disposed within said inner cavity of said internal heating member if said measured temperature of said internal heating member is below said melting point of said substance disposed within said inner cavity of said internal heating member; and inserting said internal heating member, having a temperature at least equal to said melting point of said substance disposed within said inner cavity of said internal heating member, into said mouth portion of said plastic bottle so as to heat said mouth portion of said plastic bottle at said substantially constant temperature as controlled by means of said melted substance disposed within said inner cavity of said internal heating member.

25. The method as set forth in claim 24, wherein:

said heating member is provided with at least two inner cavities within which are disposed substances having melting points which are different from each other.

26. The method as set forth in claim 24, wherein:

said internal heating member is provided with at least three inner cavities within which are disposed substances having melting points which are different from each other.

* * * * *